United States Patent
Horn et al.

(10) Patent No.: US 7,353,334 B2
(45) Date of Patent: Apr. 1, 2008

(54) METHOD OF INCREASING PERFORMANCE AND MANAGEABILITY OF NETWORK STORAGE SYSTEMS USING OPTIMIZED CACHE SETTING AND HANDLING POLICIES

(75) Inventors: Robert L. Horn, Yorba Linda, CA (US); Marc E. Acosta, San Clemente, CA (US)

(73) Assignee: Aristos Logic Corporation, Foothill Ranch, CA (US)

( * ) Notice: Subject to any disclaimer, the term of this patent is extended or adjusted under 35 U.S.C. 154(b) by 934 days.

(21) Appl. No.: 10/637,528

(22) Filed: Aug. 11, 2003

(65) Prior Publication Data
US 2004/0034746 A1   Feb. 19, 2004

Related U.S. Application Data (60) Provisional application No. 60/404,140, filed on Aug. 19, 2002.

(51) Int. Cl.
*G06F 12/08* (2006.01)
*G06F 15/177* (2006.01)
(52) U.S. Cl. .................. 711/113; 711/170; 709/221
(58) Field of Classification Search ............ None
See application file for complete search history.

(56) References Cited

U.S. PATENT DOCUMENTS

| | | | |
|---|---|---|---|
| 4,928,239 A * | 5/1990 | Baum et al. | 711/136 |
| 5,381,539 A * | 1/1995 | Yanai et al. | 711/133 |
| 5,537,571 A * | 7/1996 | Deville | 711/133 |
| 5,819,033 A * | 10/1998 | Caccavale | 709/224 |
| 5,867,685 A | 2/1999 | Fuld et al. | |
| 6,049,850 A | 4/2000 | Vishlitzky et al. | |
| 6,148,368 A | 11/2000 | DeKoning | |
| 6,163,773 A | 12/2000 | Kishi | |
| 6,216,199 B1 | 4/2001 | DeKoning et al. | |
| 6,799,248 B2 * | 9/2004 | Scherr | 711/118 |
| 6,986,018 B2 * | 1/2006 | O'Rourke et al. | 711/213 |

* cited by examiner

*Primary Examiner*—Denise Tran
(74) *Attorney, Agent, or Firm*—Dickstein Shapiro LLP (57) ABSTRACT

A system for and method of increasing performance and manageability of storage area networks using optimized cache setting and handling policies. Initial cache management policies are set on a volume or zone basis, performance statistics are gathered based on preset statistical criteria, and policies are then set according to the goal of reaching particular system performance goals. Cache performance is optimized by customizing individual cache policies according to the underlying processing needs of each volume or sub-volume within the networked storage system. Cache parameter settings are optimized in a different way depending on whether the bulk of commands processed in the volume or sub-volume are pseudo-sequential or random, as well as other system-specific considerations.

12 Claims, 7 Drawing Sheets

METHOD OF INCREASING PERFORMANCE AND MANAGEABILITY OF NETWORK STORAGE SYSTEMS USING OPTIMIZED CACHE SETTING AND HANDLING POLICIES

CROSS REFERENCE TO RELATED APPLICATIONS

This application claims the benefit of U.S. Provisional Application No. 60/404,140 filed Aug. 19, 2002, the content of which is incorporated herein in its entirety by reference.

This application is related to application Ser. No. 10/294,562, entitled "METHOD OF FLEXIBLY MAPPING A NUMBER OF STORAGE ELEMENTS INTO A VIRTUAL STORAGE ELEMENT," filed Nov. 15, 2002, now U.S. Pat. No. 6,912,643, the disclosure of which is incorporated herein by reference.

FIELD OF THE INVENTION

The present invention relates to networked storage systems.

BACKGROUND OF THE INVENTION

Networked storage systems are an emerging data communications environment in which a dedicated network connects storage devices via high-speed peripheral channels. The storage devices may be configured as a Redundant Array of Independent Disks (RAID), Just a Bunch of Disks (JBOD), or a combination of different storage topologies. In a networked storage system, the two primary performance variables are latency and bandwidth. Bandwidth is a measurement of how much data can move over the networked storage system over time, and latency is a measurement of how much delay is encountered between the execution of each command. Accordingly, system administrators strive to increase networked storage system performance by increasing the bandwidth and/or decreasing the latency.

One type of system optimization aimed primarily at lowering latency in a networked storage system is called caching, in which frequently or recently used data is stored in the fastest (but most expensive) storage device (usually semiconductor based random access memory). The high performance storage device filled with frequently or recently used data is the cache. Effective caching can significantly improve latency by minimizing the time required to service requests to frequently accessed data.

Caching can be performed at different points in a networked storage system. One of the key storage elements in storage systems, the hard disk drive, almost always has some amount of high speed solid state memory for caching operations local to the drive. In higher performance systems, the storage element controllers also provide data caching. Improving cache memory handling in the storage element controllers has the potential for dramatically increasing the overall performance of the entire networked storage system. Cache handling policies can be set at the storage element controller level to optimize the performance of a particular type of application. Different applications create different access patterns based on, for example, whether their access is pseudo-sequential or random in nature. Conventionally, caching policies are set globally, which usually means that they are tuned to whichever application is dominant in the networked storage system. This results in reduced performance when there is a mix of applications accessing a system.

There is also a growing need for systems that can virtualize multiple storage elements and allow networked storage systems the flexibility of creating virtual storage elements from multiple disparate physical storage subsystems. These network storage virtualizers benefit from cache memory architectures with similar attributes to those of storage controllers that directly control physical data storage resources. Increasing the granularity of cache policy control and management would enable a networked storage system controller/virtualizer to optimize performance across the entire RAID array, altering cache handling policies proactively to enhance application performance whether the correspondent traffic is pseudo-sequential or random.

Attempts have been made to optimize the setting and use of cache handling policies. Such a system is described in U.S. Pat. No. 6,163,773, "Data storage system with trained predictive cache management engine," assigned to International Business Machines Corporation (Armonk, N.Y.), hereby incorporated by reference. This and other conventional systems for cache handling have been unable to provide the cache policy setting granularity and computational performance necessary for the system cost/performance point currently in demand.

It is therefore an object of the invention to enable greater granularity for setting caching policies in a networked storage system controller/virtualizer.

It is another object of the invention to enable tuning of specific volumes of a networked storage system controller/virtualizer to accessing software applications.

It is yet another object of the invention to increase the cache hit rate in a networked storage system controller/virtualizer.

It is yet another object of the invention to free up cache resources for other uses as quickly as possible.

It is yet another object of the present invention to set cache predictive read policy per volume.

It is yet another object of this invention to set write cache policy per volume.

It is yet another object of this invention to collect data to monitor and evaluate cache policies per on a host and volume basis.

SUMMARY OF THE INVENTION

The present invention is directed to increasing performance and manageability of storage area networks via optimized cache setting and handling policies. The present invention provides a way to set cache policies in a networked storage system controller/virtualizer. Initial cache management policies are set on a volume or zone basis, performance statistics are gathered based on preset statistical criteria, and policies are then set according to the goal of reaching particular system performance goals. The invention optimizes cache performance by customizing individual cache policies according to the underlying processing needs of each volume or sub-volume within the networked storage system. Cache parameter settings are optimized in a different way depending on whether the bulk of commands processed in the volume or sub-volume are pseudo-sequential or random, as well as other system-specific considerations.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 1:
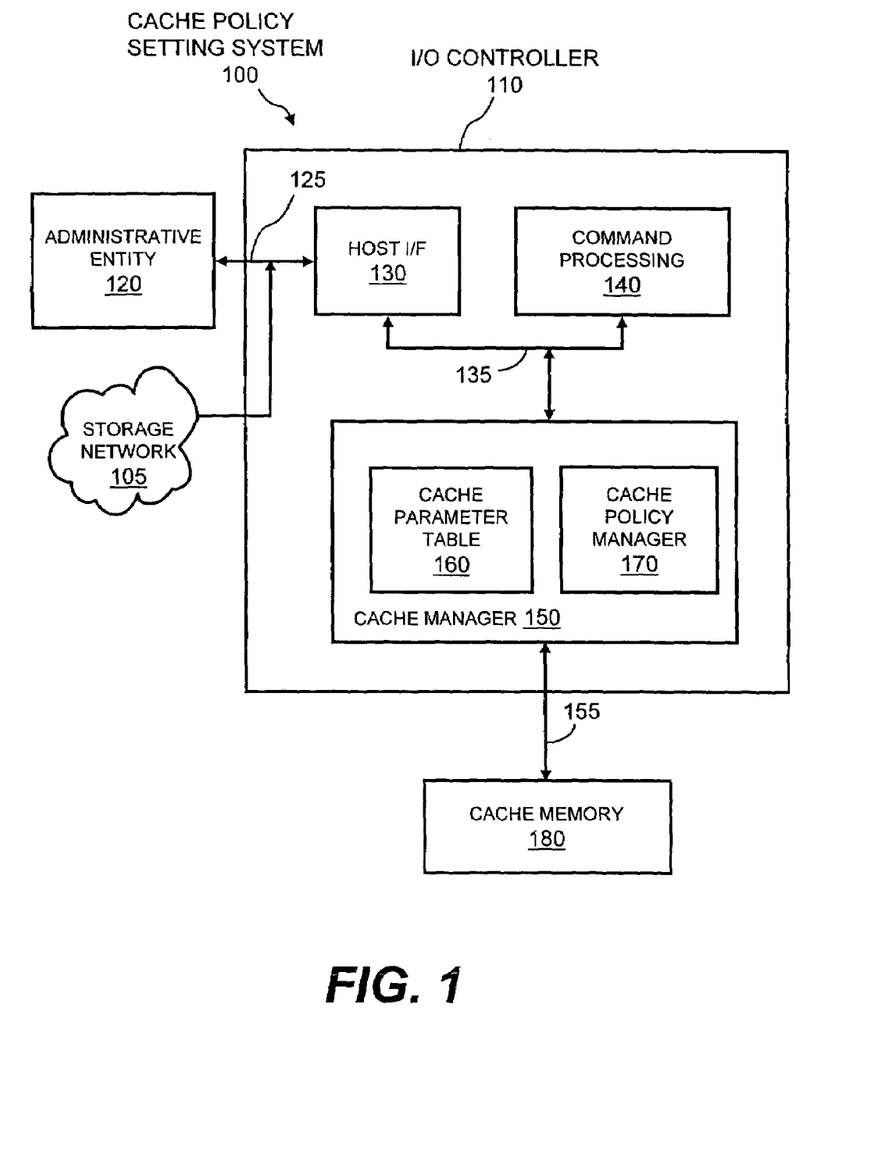
FIG. 1 is a block diagram of a cache policy setting system.

Now referring to the drawings, where like reference numerals designate like elements, there is shown in FIG. 1 a cache policy setting system 100, including a storage network 105; an I/O controller 110; an administrative entity 120; a I/F (interface) input 125; a host I/F subsystem 130; a packet control channel 135; a command processing subsystem 140; a cache manager 150, further including a cache parameter table 160 and a cache policy manager 170; a cache control channel 155, and a cache memory 180.

Storage network 105 is the external storage network environment or client process. Integrated I/O controller 110 is an integrated input/output controller. Administrative entity 120 is either a storage network system administrator or an automated cache tuning program. Host I/F subsystem 130 is a host interface subsystem responsible for receiving and decoding cache policy setting commands through host I/F input 125. Command processing subsystem 140 processes cache policy setting commands and sends the resulting policy update via packet control channel 135 to cache manager 150 and into cache parameter table 160 where all of the caching parameters are maintained. Cache policy manager 170 administers the caching policies during cache data requests (not shown). Cache manager 150 handles cache activity through cache control channel 155 to cache memory 180.

In operation, the process of cache policy setting for cache policy setting system 100 begins with administrative entity 120. Administrative entity 120, whether a person or an automated program, sends cache policy settings to integrated I/O controller 110 and into host I/F subsystem 130 through host I/F input 125. Host I/F subsystem 130 decodes the packet containing the cache policy and sends it to command processing subsystem 140. Command processing subsystem 140 processes the command, prepares the cache policy update, and forwards it on to cache manager 150. A cache policy is set for every zone within a volume, or to the available granularity of the system architecture. Volumes and sub-volumes are more thoroughly disclosed in related application Ser. No. 10/294,562 now U.S. Pat. No. 6,912,643. The cache policy for a zone is designed to optimize the particular requirements of that zone. Some zones may handle primarily pseudo-sequential commands, and some may handle primarily random commands. The optimal caching settings for pseudo-sequential commands may actually increase the latency of random commands, and vice versa.

Figure 2:
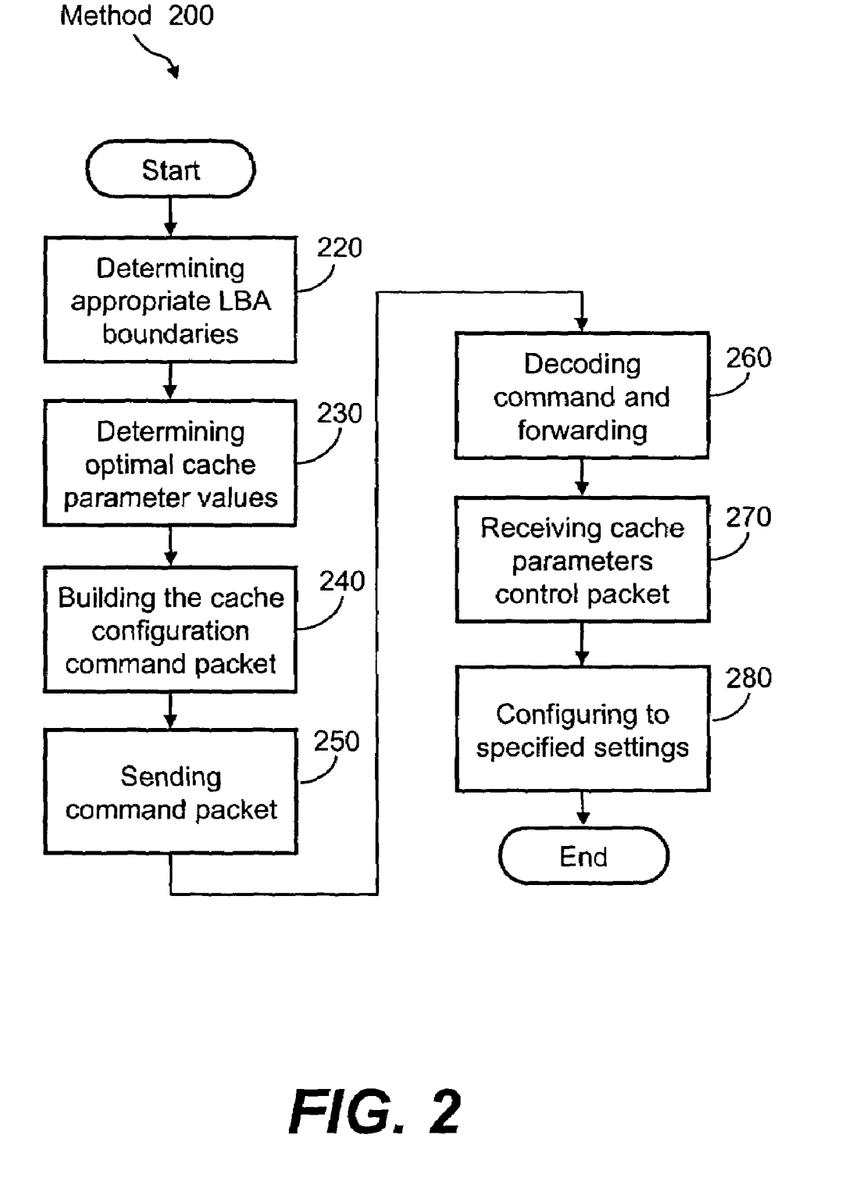
FIG. 2 is a flow diagram of a method of setting a cache policy.

FIG. 2 illustrates a method 200 of setting a cache policy, including the following steps:

Step 220: Determining Appropriate Lba Boundaries

In this step, administrative entity 120, which is either a system administrator or an automated administration program, determines the appropriate logical block address (LBA) boundaries for a particular zone on a particular volume in a networked storage system. For example, the first zone in the networked storage system to have cache policy set may be Volume A, cache zone 1. Appropriate LBA boundaries are determined by the system administrator according to the size of the volume, the size of the zone on the disk, or other system specific constraints.

step 230: Determining Optimal Cache Parameter Values

In this step, system administrative entity 120 determines the optimal cache parameter values for volume A, cache zone 1. The optimal cache parameter values for the zone are those cache parameters that enable the most efficient processing, based on a number of parameters to consider, such as command type (pseudo-sequential or random), predictive read settings, and pseudo-sequential threshold. The optimal cache parameters can be determined by studying cache statistics, or the system administrator can set parameters on an ad hoc basis.

Step 240: Building the Cache Configuration Command Packet

In this step, administrative entity 120 creates a cache configuration command packet corresponding to the cache parameter setting packet, the LBA boundaries determined in step 220, and the optimal cache parameters determined in step 230.

Step 250: Sending Command Packet

In this step, administrative entity 120 sends the command packet with associated LBA boundaries and optimal cache parameters to host I/F subsystem 130.

Step 260: Decoding Command and Forwarding

In this step, host I/F subsystem 130 decodes the command packet in order to put it into the appropriate language for integrated I/O controller 110.

Step 270: Receiving Cache Parameters Control Packet

In this step, host I/F subsystem 130 sends the decoded packet and associated control information to command processing subsystem 140.

Step 280: Configuring to Specified Settings

In this step, command processing subsystem 140 notifies cache manager 150 to update cache parameter table 160 with the cache policy setting information, in this example for volume A, cache zone 1. Method 200 then ends.

Following the same method, cache policy settings can be set for every zone in every volume in a networked storage system array. Alternatively, default cache policy settings can be predetermined and assigned when customized per-zone cache optimization is not required. At the completion of this method for all desired zones, the cache is tuned.

Figure 3:
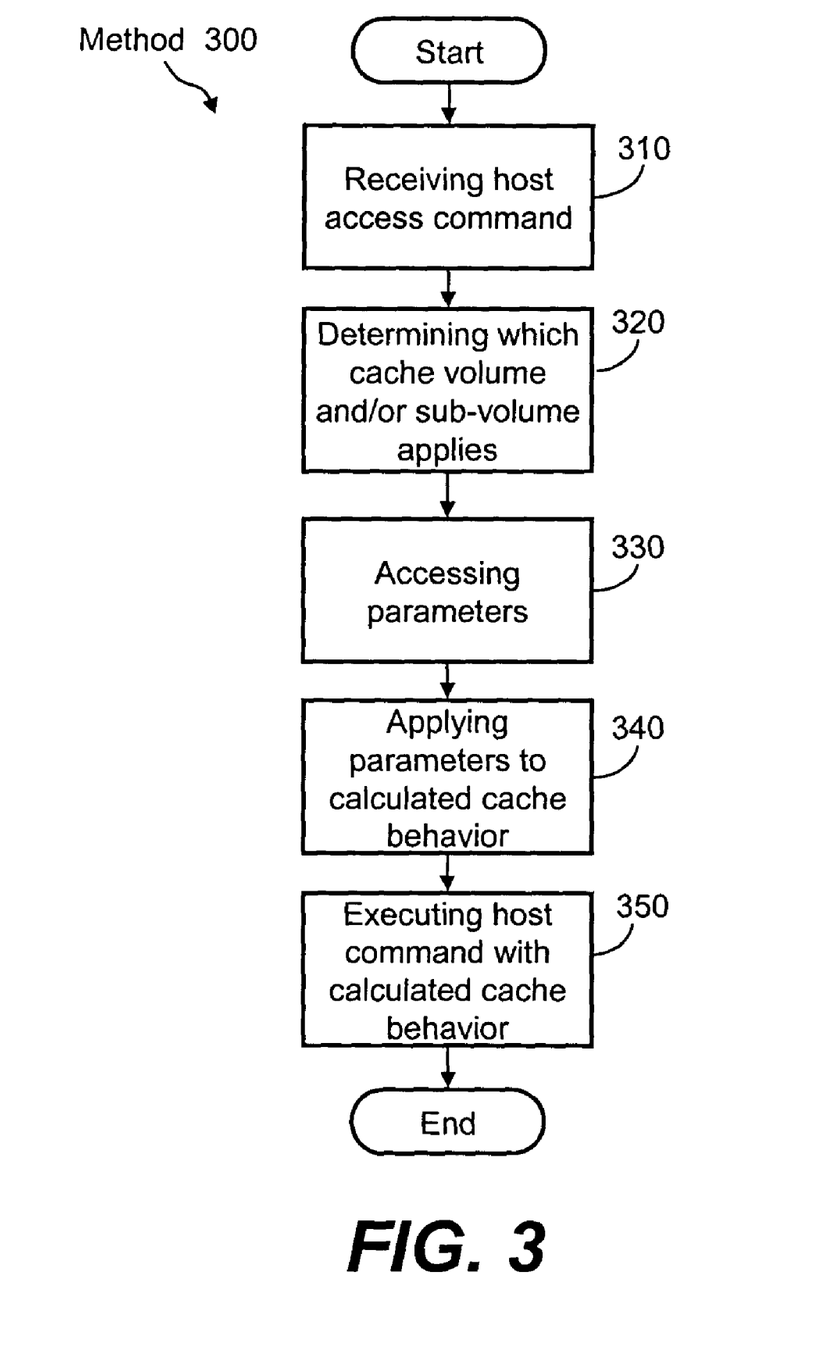
FIG. 3 is a flow diagram of a method of processing a command using zone-based cache policy settings.

FIG. 3 illustrates a method 300 of processing a command using zone-based cache policy settings, including the steps of:

Step 310: Receiving Host Access Command

In this step, integrated I/O controller 110 receives a read or write command from storage network 105, into host I/F subsystem 130. Host I/F subsystem 130 translates the command and sends the command to command processing subsystem 140.

Step 320: Determining Which Cache Volume and/or Sub-volume Applies

In this step, cache manager 150 determines which cache zone applies to the command. Each command is addressed to a particular LBA, and each LBA corresponds to a physical zone in a volume, so that the addressing information attached to each packet corresponds to the cache policy settings that were determined at the completion of method 200.

Step 330: Accessing Parameters

In this step, cache policy manager 170 queries cache parameter table 160 in order to determine the caching parameters that apply to the zone addressed by the command.

Step 340: Applying Parameters to Calculated Cache Behavior

In this step, the cache parameters are applied to the packet. Some cache optimizing parameters include activating or neutralizing predictive read settings and setting pseudo-sequential thresholds.

Step 350: Executing Host Command with Calculated Cache Behavior

In this step, the host command is executed according to the calculated cache behavior.

Figure 4:
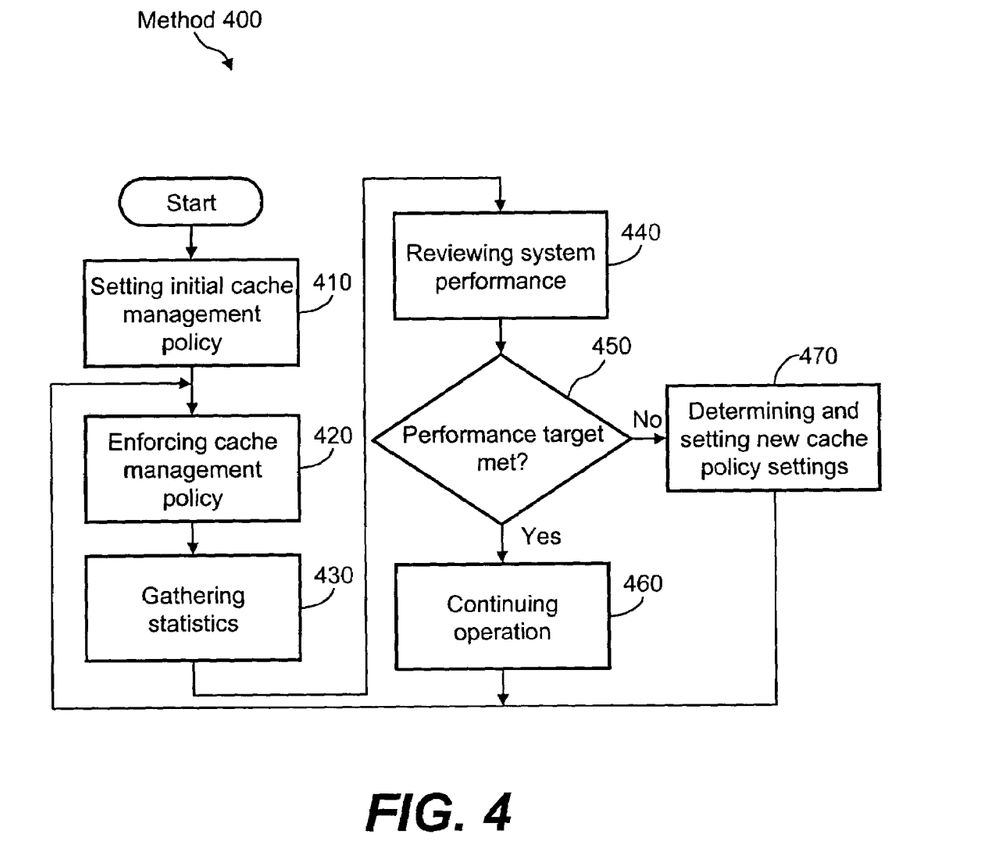
FIG. 4 is a flow diagram of a method of setting and monitoring cache management policies.

FIG. 4 illustrates a method 400 for setting and monitoring cache management policies, including the steps of:

Step 410: Setting Initial Cache Management Policy

In this step, administrative entity 120 sets a cache management policy. This cache management policy is handled based on the smallest granularity available to the RAID architecture. If different volumes or sub-volumes (i.e., zones) of the RAID system can be set to different levels of granularity, the cache policy can be customized on a volume or zone level, as needed. Alternatively, a default cache setting can be applied to those volumes and/or zones which do not have a custom cache policy.

Step 420: Enforcing Cache Management Policy

In this step, the cache management policies established in step 410 are applied to the level of granularity available in the particular RAID architecture.

Step 430: Gathering Statistics

In this step, integrated I/O controller 110 generates statistics on all of the activities accessing it. The access statistics are intended to be those metrics which can be analyzed in order to optimize the performance of the system. In one exemplary embodiment, these statistics include cache hit rates, latency times, total read sectors, total write sectors, and total number of read or write commands during a predefined period. These statistics can be saved to a storage medium and/or output to another device for further analysis.

Step 440: Reviewing System Performance

In this step, administrative entity 120 reviews the statistics in order to determine the efficacy of the RAID storage subsystem system performance based on cache management policy. RAID performance levels may also be determined with respect to any agreed upon Quality of Service (QoS) metric with a SAN service provider. Additionally, an administrative entity 120 uses the statistics to optimize cache performance.

Step 450: Performance Target Met?

In this decision step, the system determines whether the performance target has been achieved. If yes, method 400 proceeds to step 460; if no, method 400 proceeds to step 470.

Step 460: Continuing Operation

In this step, the system has determined that none of the cache management policies need to be changed. Method 400 returns to step 420 and normal RAID operations continue for a predetermined period of time before the statistics are again gathered and cache management settings examined for efficacy. This time period is set, along with other system administrative parameters, by administrative entity 120.

Step 470: Determining and Setting New Cache Policy Settings

In this step, administrative entity 120 determines new cache policy settings, based on the results of the preceding steps. Cache management variables include predictive read, a technique that is effective when a particular application uses predominantly pseudosequential read commands; cache memory handling variables such as the maximum allowable dirty cache size, maximum active cache size, dirty cache threshold, and flush on not-busy threshold. All of these are customizable parameters and can be set to meet QoS or to optimize performance. After new cache policy settings have been determined and set, method 400 returns to step 420.

Figure 5:
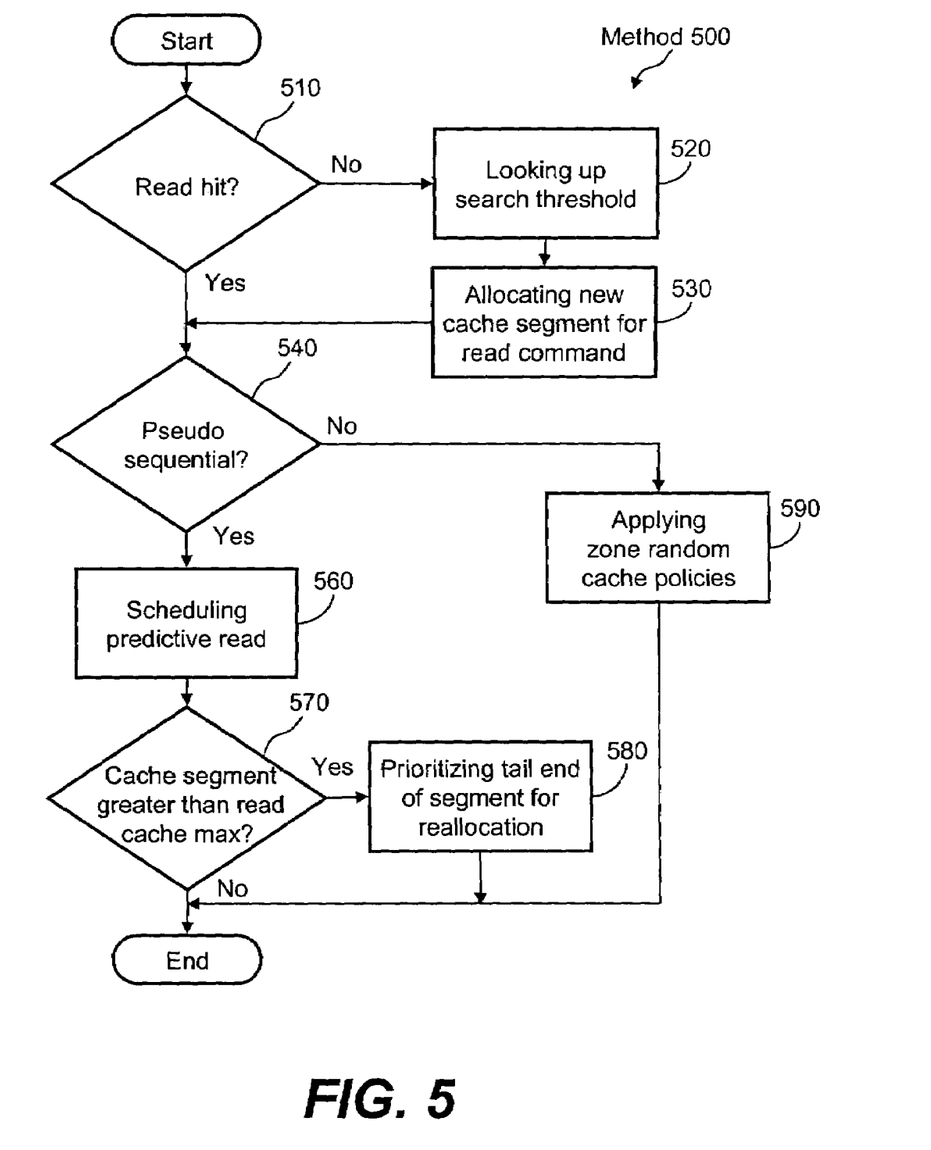
FIG. 5 is a flow diagram of a method of applying predictive read cache policy.

FIG. 5 illustrates a method 500 of applying a predictive read cache policy to a specified cache read request, including the following steps:

Step 510: Read Hit?

In this decision step, the system determines whether a read command coming into host I/F input 125 from storage network 105 is a read hit. The command is considered a read hit if the requested data is in cache memory 180. If yes, method 500 proceeds to step 540; if no, method 500 proceeds to step 520.

Step 520: Looking Up Search Threshold

In this step, cache policy manager 170 looks up the search threshold for finding nearby existing LBA cache segments. The specifications for the search threshold are stored on cache parameter table 160. Search threshold parameters are set by administrative entity 120, based on knowledge of the underlying application structure and the nature of the applications and volumes dealing primarily with pseudo-sequential accessing.

Step 530: Allocating New Cache Segment For Read Command

In this step, the system allocates a new cache segment for the read command and combines the segment with the existing cache segments with the same specified LBA range.

Step 540: Pseudo-Sequential?

In this decision step, cache manager 150 determines whether the read command is part of a pseudo-sequential series of commands, using the per volume or per-zone thresholds, which are parameters that are set by overall cache management policies by administrative entity 120 and stored on cache parameter table 160. This can be determined based on read-forward parameters as well as the history of adjacent LBA locations read from. If yes, method 500 proceeds to step 560; if no, method 500 proceeds to step 590.

Step 560: Scheduling Predictive Read

In this step, the system anticipates and "pre-reads" a certain number of adjacent LBA blocks into cache memory from the hard disk drives (not shown), based on cache management parameters that are preset by administrative entity 120 and stored in cache parameter table 160.

Step 570: Cache Segment Greater Than Read Cache Max?

In this decision step, the system determines whether the total cache segment length is greater than the maximum allowable per zone read cache length. If yes, method 500 proceeds to step 580; if no, method 500 ends.

Step 580: Prioritizing Tail End of Segment for Reallocation

In this step, the system prioritizes the tail end of the segment for reallocation. After this step, method 500 ends.

Step 590: Applying Zone Random Cache Policies

In this step, the system applies cache policies associated with random data access. After this step, method 500 ends.

At the conclusion of this method, a predictive read policy has been applied to a specific cache read request. In a similar fashion, other cache policies can be applied, including maximum allowable dirty cache size, maximum active cache size, dirty cache threshold, and flush on not-busy threshold.

In a preferred embodiment of the present invention, method 500 implements specific cache handling policies for optimizing the performance of a storage area network. More specifically, each volume in a networked storage system can be partitioned into a plurality of cache policy zones, with each zone having a unique set of parameters to control caching policies. Examples into parameters relating to, for example, sequential detection, predictive read, segment size management, and cache data retention. In one preferred embodiment, each volume can be partitioned into a maximum of three cache policy zones.

The cache memory of the present invention is operated by the cache manager 150, which utilizes a set of data structures known as cache segment descriptors. A cache segment descriptor (CSD) is a data structure associated with each granularity of cache allocation. In the present invention, the granularity of cache allocation is preferably $2^N$ sectors, where N is an integer. In one exemplary embodiment, the granularity of cache allocation is a thirty-two sector cache segment. A CSD is used to maintain the individual sector states associated with a granularity of allocation, associated segment state information, usage count, and a starting LBA value of the granularity. In the exemplary embodiment, because the granularity is set to 32 sectors, the starting LBA value is necessarily a multiple of 32. Additionally, multiple CSD's are allocated to accommodate cache space for commands spanning multiple granularities. Thus, in the exemplary embodiment, commands which cross a modulo-32 LBA boundary, or commands which transfers more than thirty-two sectors are associated with multiple CSDs. The cache manager 150 preferably stores CSDs in the cache parameter table 160, but the CSDs may be stored in any memory accessible by the cache manager 150, such as a portion of the cache memory 180 itself.

A single CSD may simultaneously contain sectors having multiple states. A CSD itself is also associated with a state corresponding to the state which, as a whole takes on the attribute which best indicates the possible use or reuse of each sector associated with the CSD. For example, since a dirty sector must be flushed to disk in order to ensure coherency, if the sector states of a CSD include one dirty sector and thirty-one non-dirty sectors, the CSD state must be set to dirty, so as to insure that the one dirty sector would be eventually flushed to disk.

Figure 6:
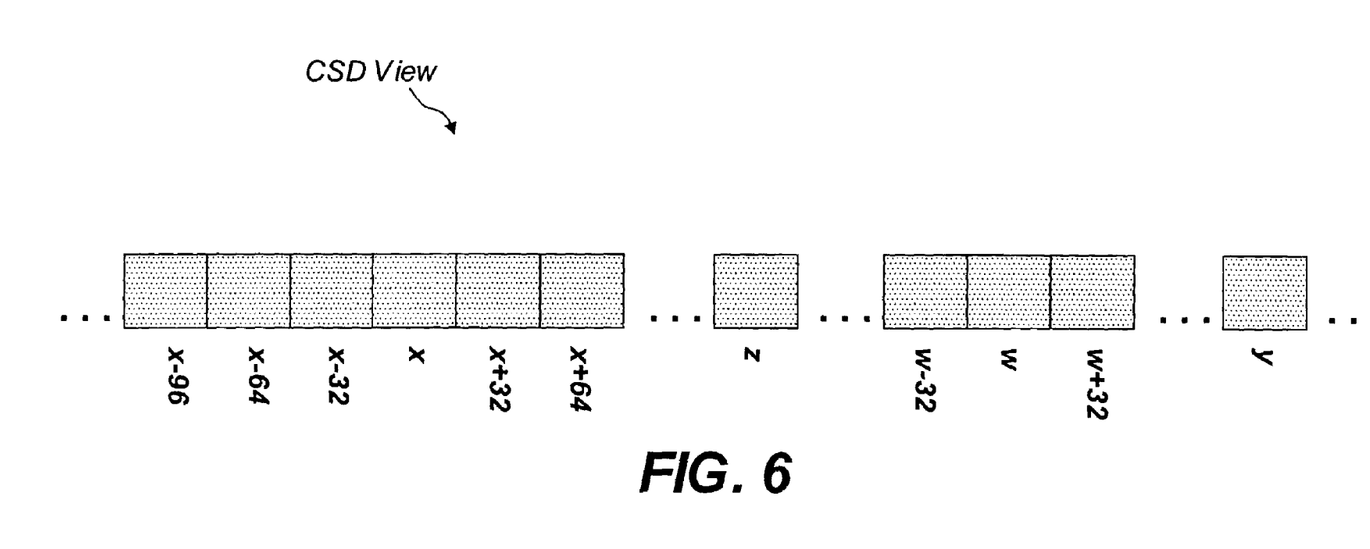
FIG. 6 is a diagram of cache segment descriptor segmentation.

When multiple CSD's are allocated for a single command, these CSD's are linked in ascending LBA order. However, because the nearest existing CSD's on either side of the new LBA range cannot be found directly, it is impractical to maintain CSD's linked by LBA order as a single contiguous chain for the entire set of CSD's. Thus, as illustrated in FIG. 6, all CSD's allocated for a particular volume are linked locally in fragments, but fragments may not be linked with each other.

Figure 7:
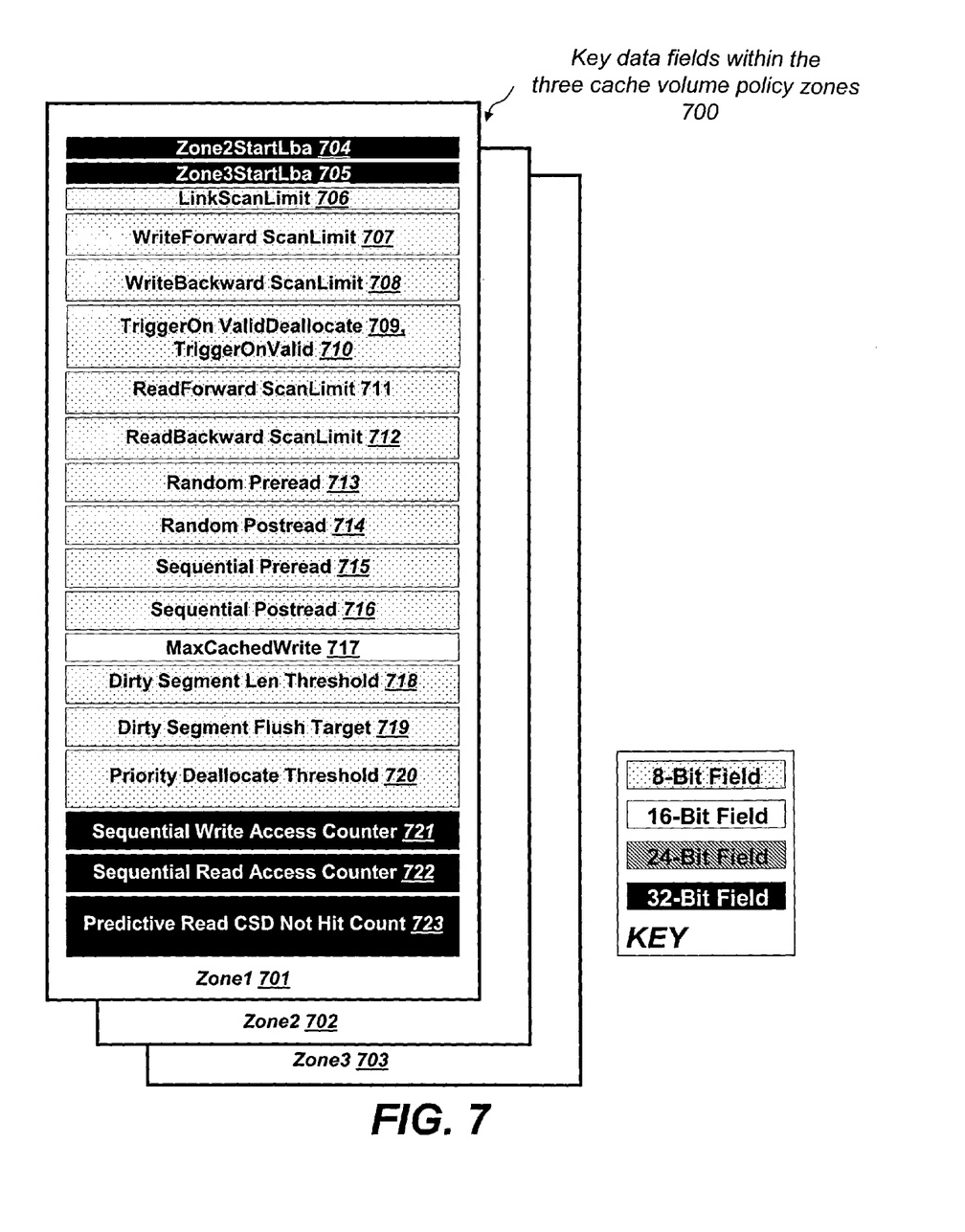
FIG. 7 illustrates the key data fields within the three cache policy zones.

FIG. 7 illustrates key data fields within the cache volume policy zones, in one exemplary embodiment of the invention. As previously noted, in this exemplary embodiment, each volume may be associated with up to three cache policy zones. Thus, FIG. 7 illustrates the key data fields within the context of a system having three cache volume policy zones (zone 701, zone 702, and zone 703) that allow the implementation of specific cache policies. These cache policies and their associated parameters are described as follows:

The parameters that describe volume cache policy zones are Zone2StartLBA 704 and Zone3StartLBA 705. Azero value indicates no zone. If Zone3StartLBA 705 is not zero, then Zone3StartLBA 705 must be greater than Zone2StartLBA 704, and Zone2StartLBA 704 must be non-zero. Additional ZoneNStartLBA parameters maybe present if the present invention is utilized in an embodiment which permits more than three cache policy zones per volume.

The LinkScanLimit 706 parameter, which is unique per volume zone, indicates to the cache management logic how many cache segment descriptor (CSD) slots on either side of a newly allocated CSD range should be scanned in an attempt to link the CSDs by ascending LBA. For zones with a random access pattern, a value of 0 for the LinkScanLimit 706 parameter would increase the cache processing efficiency by excluding the futile effort of lining new commands with existing cache ranges. A value of 1 for LinkScanLimit 706 would be sufficient to link CSDs for a zone with largely sequential access. The higher value of LinkScanLimit 706, the greater the effort is to find neighboring CSD segments with which to link.

The sequential write filter is programmable per volume zone with the parameters WriteForwardScanLimit 707, WriteBackwardscanLimit 708, and TriggerOnValidDeallocate 709. More specifically, for each write command, after the necessary CSDs have been allocated to cover the LBA range of the command, and after the allocated CSDs have been linked to neighboring preexisting CSDs as per the LinkScanLimit 706 parameter, the cache will search WriteBackwardScanLimit 708 CSDs following the reverse link or until the start of the CSD chain. If at least one CSD is found to be dirty, or the TriggerOnValidDeallocate 709 parameter is true and at least one CSD is found to be valid deallocate, then the command is tagged sequential. If, after scanning backwards, the command is not tagged sequential, the algorithm is repeated in the forward direction with the limit set by WriteForwardScanLimit 707. Because CSD states are used and not individual sector states, this algorithm does not distinguish between strictly sequential and near sequential commands with small gaps of LBA space. Also, the order in which the commands were received is not considered.

The sequential read filter is programmable per volume with the parameters ReadForwardScanLimit 711, ReadBackwardScanLimit 712, and TriggerOnValid 710. More specifically, for each read command, after the necessary CSDs have been allocated to cover the LBA range of the command, and after the allocated CSDs have been linked to neighboring preexisting CSDs as per the LinkScanLimit 706 parameter, the cache will search ReadBackwardScanLimit 712 CSDs following the reverse link or until the start of the CSD chain. If at least one CSD is found to be valid deallocate, or the TriggerOnValid 710 flag is set and at least one CSD is found to be valid, then the command is tagged sequential. If, after scanning backwards, the command is not tagged sequential, the algorithm is repeated in the forward direction with the limit set by ReadForwardScanLimit 711. Because CSD states are used and not individual sector states, this algorithm does not distinguish between strictly sequential and near sequential commands with small gaps of LBA space. Also, the order in which the commands were received is not considered.

The per volume zone parameters that control predictive read policy are RandomPreRead 713, RandomPostRead 714, SequentialPreRead 715, and SequentialPostRead 716. These values represent the number of CSDs worth of sectors to be predictively read ahead of and behind the requested read data. PreRead amounts include the first CSD of the read command, and PostRead amounts include the last CSD of the read command. This mechanism is used to distinguish predictive read amounts so that little or no predictive reading is done for random accesses, while a larger amount is done when accesses are sequential or pseudo-sequential.

Each volume zone implements a parameter MaxCachedWrite 717 that specifies a threshold on write command sector count above which the command will be a forced write to disk (no write cache.) This mechanism allows write cache resources to be reserved for smaller localized writes which get more benefit from write caching through write coalescing. Large write commands also tend to indicate a sequential stream that would receive less benefit from write caching.

The dirty segment size limit algorithm is triggered when a write command has been tagged sequential by the sequential write filter. Two parameters, DirtySegmentLengthThreshold 718 and DirtySegmentFlushTarget 719, specify the number of linked dirty CSDs before or after a sequential write command that will initiate a flush, and the target number of dirty CSDs that should remain before and/or after the command LBA range once the flush has completed.

Each volume zone provides a parameter PriorityDeallocateThreshold 720 that when met, causes valid deallocate CSDs to be placed on the LRU side of the valid or valid deallocate CSD list (rather than the MRU side) when the usage count transitions to zero. This mechanism can be used to force a low persistence on all CSDs in a zone by setting the value to 0, which causes every CSD for that zone, when no longer in use, to be "top of the list" for reallocation.

The total number of sequential writes and reads is the combination of the per volume zone SequentialWriteAccessCounter 721 and SequentialReadAccess Counter 722. An additional responsibility of the cache is to monitor per volume zone PredictiveReadCsdNotHitCount 723. This counter is incremented each time a Valid CSD (i.e. a CSD with predictive read data that was never read by any host) is reallocated.

The present invention therefore permits an administrative entity to assign cache policies to individual spans of LBAs in the storage system. After the cache policies have been set, host commands to the storage system are processed by determining which cache volume (or sub-volume) is implicated by the command and the cache memory is operated in accordance with parameters which reflect the cache policy set by the administrative entity. The administrative entity can then observe and compare the storage system performance with performance targets (goals) and modify the cache policy to optimize the storage system performance, if necessary.

While the invention has been described in detail in connection with the exemplary embodiment, it should be understood that the invention is not limited to the above disclosed embodiment. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. A method of optimizing cache performance in a storage area network, comprising:
   (a) setting an initial cache management policy for at least a portion of storage in said storage area network, comprising the steps of:
      choosing an initial cache management policy for at least a portion of a storage volume of said storage area network;
      determining an address range of said portion of a storage volume;
      constructing a command packet, wherein said command packet includes said initial cache management policy and said address range;
      sending said command packet to a cache controller of said storage area network; and
      configuring said cache controller to operate the cache memory in accordance with said initial cache management policy with respect to said portion of a storage volume;
   (b) operating said cache in accordance with said initial cache management policy for host command accessing said portion of storage, wherein said operating includes gathering cache operation statistics;
   (c) determining whether a system performance goal has been met;
   (d) if said system performance goal has not been met, determining a new cache management policy for said portion of storage, and repeating steps (a), (b), and (c) until said system performance goal has been met.

2. The method of claim 1, wherein said steps of choosing, determining, constructing, and sending are performed from an administrative entity of said storage area network.

3. The method of claim 2, wherein said administrative entity comprises an storage network system administrator.

4. The method of claim 2, wherein said administrative entity comprises an automated cache tuning program.

5. The method of claim 1, wherein said step of choosing further comprises: determining a plurality of cache operation parameters, wherein said plurality of cache operation parameters improves cache performance for one of a plurality of a predetermined access patterns.

6. The method of claim 5, wherein said plurality of predetermined access patterns includes sequential reading, sequential writing, random reading, random reading, and random writing.

7. The method of claim 1, wherein said step of setting an initial cache management policy includes setting the initial cache policy for at least one storage volume or portion thereof, a host access command being associated with said at least one storage volume or portion thereof.

8. The method of claim 7, wherein said host access command is associated with an address range associated with the at least one storage volume or portion thereof.

9. The method of claim 7, wherein said initial cache management policy includes a parameter controlling how many sectors ahead of an address range associated with the host access command are to be read.

10. The method of claim 7, wherein said initial cache management policy includes a parameter controlling how many sectors before an address range associated with the host access command are to be read.

11. The method of claim 1, wherein said portion of storage comprises a single volume in said storage area network.

12. The method of claim 1, wherein said portion of storage comprises a portion of a single volume in said storage area network.

* * * * *